United States Patent [19]

Leimer et al.

[11] Patent Number: 5,308,561
[45] Date of Patent: May 3, 1994

[54] PROCESS FOR PRODUCTION OF A $Si_3N_4$, BASED MATERIAL

[75] Inventors: Gerhard Leimer, Roedental; Gerhard Wötting, Coburg; Ernst Gugel, Roedental, all of Fed. Rep. of Germany

[73] Assignee: Bayer AG, Leverkusen, Fed. Rep. of Germany

[21] Appl. No.: 44,569

[22] Filed: Apr. 8, 1993

Related U.S. Application Data

[63] Continuation of Ser. No. 822,722, Jan. 21, 1992, abandoned.

[30] Foreign Application Priority Data

Jan. 30, 1991 [DE] Fed. Rep. of Germany ....... 4102628

[51] Int. Cl.⁵ .............................................. C04B 35/65
[52] U.S. Cl. ....................................... 264/65; 501/97; 501/98; 501/92
[58] Field of Search ..................... 264/65; 501/97, 98, 501/92

[56] References Cited

U.S. PATENT DOCUMENTS

| | | | |
|---|---|---|---|
| 4,487,840 | 12/1984 | Raj et al. | 501/97 |
| 4,552,711 | 11/1985 | Raj et al. | 264/65 |
| 4,781,874 | 11/1988 | Edler | 264/65 |
| 4,919,868 | 4/1990 | Huang | 501/97 |
| 4,997,604 | 3/1991 | Hofer et al. | 264/65 |

FOREIGN PATENT DOCUMENTS

| | | |
|---|---|---|
| 013382 | 4/1989 | European Pat. Off. |
| 0377408 | 7/1990 | European Pat. Off. |
| 57-166375 | 10/1982 | Japan |
| 57-166380 | 10/1982 | Japan |
| 60-16870 | 1/1985 | Japan |
| 60-215576 | 10/1985 | Japan |
| 62-83373 | 4/1987 | Japan |
| 1546928 | 5/1979 | United Kingdom |
| WO 8204245 | 12/1982 | World Int. Prop. O. |

OTHER PUBLICATIONS

Partial Translation of Japanese Pat. Application Laid-Open Publication (Kokai) No Sho. 64-52678, Feb. 28, 1989.
*Janaf Thermochemical Tables,* Second Edition, NSRDS-NBS 37, (Jun. 1971).
A. G. Evans, "Non-Destructive Failure Prediction in Ceramics", *Progress in Nitrogen Ceramics,* (1983), pp. 595-625.
Abstract of JP-A-60/215576.
Abstract of JP-A-60/16870.
Abstract of JP-A-62/83373.
Abstract of JP-A-57/166375.
Abstract of JP-A-57/166380.
Chemical Abstracts, vol. 111, No. 14, "Manufacture of high-density silicon nitride ceramics", Oct. 2, 1989.
Chemical Abstracts, vol. 113, No. 6, "Quick preparation of reaction-sintered compact silicon nitride articles", Aug. 6, 1990.

*Primary Examiner*—James Derrington
*Attorney, Agent, or Firm*—Connolly & Hutz

[57] ABSTRACT

High-strength $Si_3N_4$-based material with a narrow range spread of values for mechanical properties useful for producing thick-walled ceramic parts for internal combustion engines, thick-walled ceramic fittings or cutting tools is produced by molding a powder-form starting mixture comprising powdered $Si_3N_4$, finely divided elemental silicon and sintering additives, and subsequently heat treating the mixture to obtain a sintered molding very near the theoretical density of the material.

10 Claims, No Drawings

PROCESS FOR PRODUCTION OF A SI₃N₄ BASED MATERIAL

This application is a continuation of application Ser. No. 07/822,722 filed Jan. 21, 1992, now abandoned.

This invention relates to a process for the production of a high-strength material based on $Si_3N_4$ with a narrow spread of the mechanical properties by molding of a powder-form starting mixture of $Si_3N_4$ and sintering additives and subsequent heat treatment to very near the theoretical density of the material, to materials produced by this process and to their use.

BACKGROUND OF THE INVENTION $Si_3N_4$ materials and parts are normally produced by mixing sinterable $Si_3N_4$ starting powder characterized by high fineness and purity with sintering additives, such as $MgO$, $Y_2O_3$, $Al_2O_3$ and/or $ZrO_2$, in concentrations of <15% by weight, molding the resulting mixture and subsequently densifying the molding by a heat treatment. The heat treatment may be carried out under atmospheric nitrogen pressure by sintering or axial hot pressing or under elevated gas pressure in $N_2$ or a mixture of $N_2$ and an inert gas by gas pressure sintering or hot isostatic pressing. The reaction of the sintering additives with the oxygen typically present in silicon nitride starting powders, in which it may be assumed to be present as $SiO_2$ or $Si_2N_2O$, produces a liquid phase so that sintering mechanisms, such as rearrangements induced by capillary forces and solution-reprecipitation processes, can occur. These processes are promoted by oxidic impurities, such as alkali metals, alkaline earth metals, iron and other metal oxides, because they contribute towards formation of the liquid phase. After densification, the liquid phase remains in the material, generally as a glass-like secondary phase at grain boundaries and triple points, and adversely affects the properties of the material, above all at relatively high temperatures.

In addition to this adverse effect on the mechanical properties by the grain boundary phase, other impurities, such as elemental Si, metals or silicides, which melt at temperatures below the sintering temperature, can impair the mechanical properties because the spherical droplets formed during melting are no longer dissolved by the liquid phase. These droplets remain in the material as foreign particles after the solidification of the liquid phase and, because of their different thermal expansion and elastic properties by comparison with the matrix material, lead to stress concentrations which often act as failure-initiating defects (Evans, A. G.: Non-Destructive Failure Prediction in Ceramics, in: F. L. Riley (ed.) "Progress in Nitrogen Ceramics", Martinus Nijhoff Publ., Boston, 1983, pages 595 to 625).

Accordingly, since the strength of a material is reduced by such inclusions, a quality criterion for $Si_3N_4$ powders is that their content both of metallic impurities and of free silicon should be as low as possible.

In addition to these particulate inclusions, large pores, voids or internal cracks, of which the causes can generally be attributed to inhomogeneities in the starting powder, granule defects or stresses in the moldings, act as failure-initiating defects and have a strength-reducing effect accompanied by an increase in the spread of the properties. In many cases, stress-induced cracks are formed on heating to the sintering temperature, being promoted by thermal gradients in the specimens.

BRIEF DESCRIPTION OF THE INVENTION

The problem addressed by the present invention was to provide a process by which it would readily be possible to produce $Si_3N_4$-based materials having high strength and reliable mechanical properties.

It has now been found that, in contrast to free Si as an impurity in the $Si_3N_4$ starting powder, the controlled addition of silicon to the sintering mixture, i.e. the starting mixture of $Si_3N_4$ powder and sintering additives, and suitable management of the heat treatment process lead to a distinct improvement in the strength level or, in general, in the mechanical properties of the material up to high temperatures.

DETAILED DESCRIPTION

The present invention relates to a process for the production of a high-strength material based on $Si_3N_4$ with very little spread of the mechanical properties by molding of a powder-form starting mixture of $Si_3N_4$ and sintering additives and subsequent heat treatment to very near the theoretical density of the molding, elemental Si being added in fine form to the powder-form starting mixture of $Si_3N_4$ and sintering additives.

High-strength $Si_3N_4$-based material with a narrow range spread of values for mechanical properties useful for producing thick-walled ceramic parts for internal combustion engines, thick-walled ceramic fittings or cutting tools is produced by molding a powder-form starting mixture comprising powdered $Si_3N_4$, finely divided elemental silicon and sintering additives, and subsequently heat treating the mixture to obtain a sintered molding very near the theoretical density of the material.

Although the addition of silicon is described in the patent literature, the objective and mode of action are both completely different and are even contrary to the basic concept of the present invention.

Thus, U.S. Pat. No. 4,552,711 describes the advantageous effect of 1 to 7% by weight silicon in a $Si_3N_4$ sintering mixture on densification. In contrast to the present invention, however, free silicon has to be present during the sintering process to suppress decomposition of the silicon nitride under the effect of the silicon vapor pressure attributable to the free silicon. The presence of free silicon during the sintering process is achieved by the use of relatively coarse silicon. Despite quite high densification, however, no particularly favorably strengths are expected, nor are any strength values actually mentioned.

By contrast, the present invention is based on the complete conversion of the silicon into $Si_3N_4$ before the densification stage with resulting high strengths and very little spread of properties, even in parts of large volume.

EP-A 0 313 382 describes a process for the production of silicon nitride parts by coating of $Si_3N_4$ powder with silicon, molding of the powder thus coated to form molded parts and subsequent nitriding, optionally followed by sintering. The advantage of this process is said to lie in considerably shorter nitriding times in relation to moldings of pure silicon. This indicates that, in contrast to the subject of the present invention, the silicon nitride is not sintered silicon nitride, but reaction-sintered silicon nitride which may optionally be post-sintered in another separate step. No properties are mentioned.

Japanese patent application JP-A 60/215 576 describes the production of sialones by mixing of silicon, $Si_3N_4$, $Al_2O_3$ and $ZrO_2$, the silicon/silicon nitride mixture containing 90 to 20% by volume silicon and 10 to 80% by volume silicon nitride. Only very moderate strengths are achieved.

Similar results are reported in Japanese patent application JP-A 60/16 870 where, instead of zirconium oxide, magnesium oxide is used in addition to aluminium oxide as an additive and the silicon/$Si_3N_4$ mixture contains 100 to 20% by volume silicon and 0 to 80% by volume silicon nitride.

Similarly to U.S. Pat. No. 4,552,711, Japanese patent application jP-A 62/83 373 describes the favorable effect of adding silicon to silicon nitride and sintering additives on suppressing the decomposition of $Si_3N_4$, i.e. in contrast to the present invention, free silicon has to be present during the sintering stage. The maximum silicon concentration is said to be 5% by weight, although a concentration of only 2% is mentioned in the sole Japanese Example. This is in direct contrast to the present invention where all the silicon is converted into silicon nitride before the sintering stage and more silicon is actually an advantage due to the exothermy and the more homogeneous micro-structure development.

In addition to titanium, chromium, aluminium, magnesium, beryllium, calcium, zirconium, barium and lithium, Japanese patent applications JP-A 57/166 375 to 57/166 380 also describe silicon as advantageous for reducing oxides adhering to the surface of silicon nitride powder, recommending a heat treatment in a reducing atmosphere below the sintering temperature. This teaching is clearly in contrast to the present invention and also offers no encouragement towards the present invention, but instead actually leads away from the idea underlying the invention. In addition, the materials according to this invention are not dense and, accordingly, have correspondingly low strengths.

The quantity of silicon added in the process according to the invention is preferably up to 25% by weight.

However, the addition of silicon in accordance with the invention produces particularly positive effects in quantities of up to 20% by weight Si providing the temperature and atmosphere conditions during sintering are established in such a way that complete reaction of the Si with nitrogen gas to $Si_3N_4$ takes place in accordance with the reaction scheme described above before the melting point of Si (approx. 1,400° C.) is reached and before formation of the liquid phase begins. Concentrations of more than 20% Si can lead to difficulties and unfavorably long cycle times due to strong exothermy during the sintering process.

Accordingly, in one particularly preferred embodiment of the process according to the invention, the silicon is added in a quantity of 5 to 20% by weight.

Another criterion for the particular effectiveness of the added silicon is the nature of the sintering additive used. In the case of oxides, the sintering additive must show a more negative free enthalpy of formation than oxidation of the free Si in the nitriding temperature range (approx. 1,000° to 1,500° C.). If this is not the case, the Si will reduce the oxide added with simultaneous oxidation of the Si, so that the effects of adding silicon to the sintering mixture which are described hereinafter will not occur. From thermodynamic data tables, such as for example the JANAF Thermochemical Tables, NSRDS NBS 37, 1971, it can be seen that the following oxides are thus suitable sintering additives for the process according to the invention: $Li_2O$, $BeO$, $MgO$, $CaO$, $SrO$, $BaO$, $Al_2O_3$, $Sc_2O_3$, $Y_2O_3$, $La_2O_3$ and all other rare earth oxides, $TiO_2$, $ZrO_2$, $HfO_2$.

By contrast, oxides having a lower (less negative) enthalpy of formation than oxidation of the silicon are unsuitable. These oxides are $Na_2O$, $K_2O$, $B_2O_3$, $V_2O_5$, $Ta_2O_5$, $Cr_2O_3$, $MnO_2$, $FeO$, $Fe_2O_3$, $CoO$, $NiO$, $CuO$, $ZnO$, etc. These compounds are reduced by Si to the elements which react with $Si_3N_4$ to form silicides, nitrides or other mixed phases which, as described above, would again lead to stress concentrations and, hence, to strength-reducing defects on account of their different thermal expansion behavior and their different elastic properties compared with $Si_3N_4$.

The same applies to the addition of nitrides as sintering additives either individually or in combination with oxides. In this case, too, the free enthalpy of formation of the nitride at temperatures in the range from 1,000° to 1,500° C. must be more negative than that of the reaction of Si with $N_2$ to $Si_3N_4$, otherwise the Si added would reduce the nitride sintering additive. As described for the oxides, the elemental residue remaining would continue reacting with the $Si_3N_4$ matrix material and would form unwanted phases. Accordingly, the nitride sintering additives or additions suitable in accordance with the invention comprise the following group: $Be_3N_2$, $BN$, $AlN$, $ScN$, $YN$, $LaN$ and other rare earth nitrides, $TiN$, $ZrN$, $HfN$, $NbN$, $TaN$, etc. By contrast, $Li_3N$, $Mg_3N_2$, $Ca_3N_2$, $Sr_3N_2$, $Ba_3N_2$, $VN$, $CrN$, $Mo_2N$, $MnN$, $Fe_3N$ are unsuitable.

Accordingly, the particularly preferred embodiment of the process according to the invention is characterized in that $Li_2O$, $BeO$, $MgO$, $CaO$, $SrO$, $BaO$, $Al_2O_3$, $Sc_2O_3$, $Y_2O_3$, $La_2O_3$ and all other rare earth oxides, $TiO_3$, $ZrO_3$, $HfO_2$ and/or $Be_2N_2$, $BN$, $AlN$, $ScN$, $YN$, $LaN$ and other rare earth nitrides, $TiN$, $ZrN$, $HfN$, $NbN$, $TaN$ and/or $SiC$ or $B_4C$ are used individually or in combination as sintering additives in quantities of up to 15% by weight, based on the mixture as a whole.

Accordingly, particularly good results are achieved when the sintering additives are those which do not enter into any reaction with the silicon added under the sintering conditions.

The difference in the mode of action between free, specifically added Si and free Si as an impurity in $Si_3N_4$ starting powders lies in the fact that the free Si in the $Si_3N_4$ powder is enclosed in $Si_3N_4$ grains and hence is shielded against any reaction with nitrogen. If, now, the $Si_3N_4$ grain is dissolved by the described dissolution-reprecipitation process during sintering, the (molten) Si microsphere again remains shielded in the liquid phase. By combination with other Si inclusions or even by reaction with the liquid phase, the strength-determining defects described above can ensue therefrom.

If, by contrast, the Si is specifically added, as in the process according to the invention, and providing management of the process ensures that it is available to the gas until it has completely reacted with nitrogen to $Si_3N_4$, the density of the molding is initially increased by the increase in volume of approximately 20% by volume accompanying this reaction. This facilitates sintering because less material has to be transported for complete densification. This reduces overall shrinkage which in turn reduces the danger of internal cracks being formed through differences in contraction between the surface and the interior of the specimen. This effect thus contributes towards increasing the strength level and reducing the spread of the individual values.

Another positive effect of applying the process according to the invention ensues from the nature of the reaction of the Si to the $Si_3N_4$. It is known in this connection that the reaction takes place at least partly in the gas phase, so that the newly formed product is deposited in pores and other voids of the molding. On the one hand, this reduces overall porosity which is equivalent to the above-described increase in the green density. From measurements of the pore size distributions, for example using a mercury pressure porosimeter, it is also apparent that the overall pore size distribution is displaced to lower values. This in turn has a favorable effect on sintering behavior and on the level of stresses built up during sintering because shrinkage is correspondingly reduced. At the same time, however, there is a reduction in the size of defects in moldings, for example large pores, voids or molding cracks, which helps towards their elimination during sintering. Potentially critical defects are thus reduced in size which is equivalent to an increase in the strength level and in reliability.

By virtue of the nature of the reaction between Si and $N_2$, another advantage results from the release of heat. It is known that this reaction is an exothermic reaction in which approx. 720 kJ are released per mol Si. This generation of heat leads to considerable temperature equalization within the molding at approx. 1400° C., i.e. just below the temperature at which the liquid phase is formed and in which sintering begins. Temperature gradients which can lead to differences in shrinkage and hence to the development of microcracks and macrocracks in specimens, but above all in molded parts of large volume, are thus reduced, preventing the formation of such strength-reducing defects.

The results according to the invention are achieved providing the heat treatment is carried out by sintering under atmospheric or elevated $N_2$ pressure, including hot isostatic pressing (HIP), or by axial hot pressing. Materials having particularly favorable properties are obtained by gas pressure sintering.

Accordingly, the application of the process according to the invention and, more particularly, the combination of all these effects in conjunction with the use of the preferred sintering additives according to the invention results in a significant increase in the strength of $Si_3N_4$ materials together with a significant reduction in the spread of the individual values, i.e. an increase in the reliability of the material, both of test specimens and of relatively large and complex parts.

Accordingly, the present invention also relates to materials obtained by the process according to the invention and to the use of the materials according to the invention. The materials according to the invention are eminently suitable for the production of ceramic moldings which are exposed in use to severe mechanical, thermal, corrosive and/or abrasive stressing. The moldings may differ in their geometry and wall thickness. In a particularly preferred embodiment, the materials according to the invention are used for thick-walled ceramic parts in internal combustion engines. The present invention also relates to the use of the materials according to the invention for the production of highly stressed ceramic components, particularly thick-walled ceramic fittings or cutting tools.

The following Examples are intended to illustrate the invention without limiting it in any way.

EXAMPLES

Five mixtures were compared, namely a basic mixture A with no addition of Si and the same basic mixture with equivalent additions of 5% Si (B), 10% Si (C), 20% Si (D) and 25% Si (E). 5% by weight $Y_2O_3$ + 1% by weight $Al_2O_3$ were added as sintering additives to each mixture (specific surface $\geq 5$ $m^2$/g, purity = 99%).

The $Si_3N_4$ powder used has a specific surface of approx. 20 $m^2$g, an oxygen content of approx. 1.8% by weight and a total content of metallic impurities of $\leq 0.15\%$ by weight.

The Si powder used has a fineness of $\leq 20$ $\mu$m and a purity of $\geq 98\%$.

The mixtures are prepared by grinding in a liquid $H_2O$-free medium, such as alcohol, concentrated by evaporation, dried, sieved and molded to test specimens, in the present case to plates measuring $60 \times 70 \times 8$ mm.

Heating to the maximum sintering temperature Ts was carried out under constant conditions in a graphite-resistance-heated gas-pressure sintering furnace at up to 100 bar as follows:

| Segment No. | Heating time [mins.] | Target temperature [°C.] | Holding time [mins.] | Gas pressure ($N_2$) [bar] |
|---|---|---|---|---|
| 1 | 60 | 1,000 | 30 | $\leq 0.01$ |
| 2 | 60 | 1,200 | — | 1 |
| 3 | 120 | 1,400 | — | 1 |
| 4 | 60 | Ts | | |

The conditions at Ts differ according to whether so-called low-pressure sintering or gas-pressure sintering was carried out and are shown in the following Table of results.

The sintering density was determined on the archimetric principle in water while flexural strength was determined at room temperature on ground test specimens measuring $3 \times 4 \times 45$ mm in accordance with DIN draft 51 110 of February, 1990.

TABLE 1

| Mixture % by weight Si to $Si_3N_4$ + 5$Y_2O_3$ + 1$Al_2O_3$ | Sintering conditions at Ts | | | Sintering density | Flexural strength at RT 4-point, 40/20 mm | |
|---|---|---|---|---|---|---|
| | T [°C.] | t [mins.] | P [bar $N_2$] | $\rho s$ [g/$cm^3$] | $\sigma \pm s$ [MPa] | $\sigma$ — max [MPa] |
| A: 0 | 1800 +1875 | 60 60 | 1 10 | 3.25 | 680 ± 68 | 736 |
| B: 5 | Constant as A | | " | 3.24 | 749 ± 38 | 796 |
| C: 10 | " | " | " | 3.23 | 783 ± 54 | 854 |
| D: 20 | " | " | " | 3.18 | 691 ± 76 | 746 |
| E: 25 | " | " | " | 3.12 | — | — |
| | 1860 | 120 | 10 | | | |

TABLE 1-continued

| Mixture % by weight Si to $Si_3N_4 + 5Y_2O_3 + 1Al_2O_3$ | Sintering conditions at Ts | | | Sintering density | Flexural strength at RT 4-point, 40/20 mm | |
|---|---|---|---|---|---|---|
| | T [°C.] | t [mins.] | P [bar $N_2$] | $\rho s$ [g/cm 3] | $\sigma \pm s$ [MPa] | $\sigma - max$ [MPa] |
| A: 0 | +1700 | 90 | 100 | 3.24 | 782 ± 84 | 862 |
| B: 5 | Constant as A | " | " | 3.24 | 884 ± 34 | 919 |
| C: 10 | " | " | " | 3.26 | 889 ± 53 | 934 |
| D: 20 | " | " | " | 3.25 | 971 ± 18 | 989 |
| E: 25 | " | " | " | 3.20 | 704 ± 49 | 753 |

As can be seen from the results, the Si-containing mixtures achieve higher medium and maximum strength values than the Si-free comparison mixture A for substantially the same sintering density. In addition, the strength values of the test specimens of the Si-containing mixtures show a distinctly narrower spread. The effects occur irrespective of the sintering conditions selected, the overall strength level being increased after gas pressure sintering.

EXAMPLE 2

The object of this Example is demonstrate the positive effect of the exothermic nature of the Si reaction during sintering on the resulting strengths at room-temperature of thick-walled test specimens. Mixtures A and D of Example 1 are compared for this purpose, results of 8 mm thick plates being compared with those of 20 mm thick plates in the green state. The materials used, the preparation of the mixtures and the production of the test specimens are identical with Example 1.

TABLE 2

| Mixture % by weight Si to $Si_3N_4 + 5Y_2O_3 + 1Al_2O_3$ | Sintering conditions at Ts | | | Sintering density | Flexural strength at RT 4-point, 40/20 mm | |
|---|---|---|---|---|---|---|
| | T [°C.] | t [mins.] | P [bar $N_2$] | $\rho s$ [g/cm 3] | $\sigma \pm s$ [MPa] | $\sigma - max$ [MPa] |
| A: 0; 8 mm thick | 1860 +1700 | 120 90 | 10 100 | 3.24 | 782 ± 84 | 862 |
| D: 20; 8 mm thick | 1860 +1700 | 120 90 | 10 100 | 3.25 | 971 ± 18 | 989 |
| A: 0; 20 mm thick | 1860 +1700 | 120 90 | 10 100 | 3.23 | 736 ± 106 | 876 |
| D: 20; 20 mm thick | 1860 +1700 | 120 90 | 10 100 | 3.25 | 843 ± 59 | 894 |

The results of this Example show that the difficulties occuring in the sintering of thick-walled test specimens, which lead to a reduction in the strength level and to an increase in the spread of the strength values (mixture A), can be significantly reduced by addition of Si to the starting mixture. The reason for this lies in the above-mentioned effects as a whole, but above all in the temperature equalization within the test specimen at the beginning of sintering due to the exothermic nature of the Si reaction.

EXAMPLE 3

This Example demonstrates the significance of the choice of the sintering additive on the basis of the foregoing observations on the thermodynamic stability of the sintering additives. The basic mixture containing 5 $Y_2O_3 + 1$ $Al_2O_3$ (% by weight) is compared with a mixture containing 9.3 $Ta_2O_5 + 0.96$ $Al_2O_3$ as sintering additive (% by weight; corresponds in molar terms to 5% by weight $Y_2O_3 + 1\%$ by weight $Al_2O_3$), in each case with and without added Si. The $Ta_2O_5$ used had a specific surface of approx. 5 m²/g and a purity of $\geq 99.8\%$. The other materials used, the preparation of the mixtures and the production of the test specimens are identical with Example 1.

TABLE 3

| Mixture % by weight Si to the (basic mixture) | Sintering conditions at Ts | | | Sintering density | Flexural strength at RT 4-point, 40/20 mm | |
|---|---|---|---|---|---|---|
| | T [°C.] | t [mins.] | P [bar $N_2$] | $\rho s$ [g/cm 3] | $\sigma \pm s$ [MPa] | $\sigma - max$ [MPa] |
| A: 0($5Y_2O_3/1Al_2O_3$) | 1800 +1875 | 60 60 | 1 10 | 3.25 | 680 ± 68 | 736 |
| F: 0($9.3Ta_2O_5/0.95Al_2O_3$) | 1800 +1875 | 60 60 | 1 10 | 3.34 | 615 ± 54 | 674 |
| B: 5($5Y_2O_3/1Al_2O_3$) | 1800 +1875 | 60 60 | 1 10 | 3.24 | 749 ± 38 | 796 |
| G: 5($9.3Ta_2O_5/0.95Al_2O_3$) | 1800 +1875 | 60 60 | 1 10 | 3.32 | 542 ± 72 | 622 |

In contrast to sample F, TaN and TaSi phases can be detected by X-ray photography in the sintered sample G, showing that, due to the thermodynamic instability of $Ta_2O_5$ in the presence of Si, a different reaction takes place, inhibiting sintering and leading to the formation of strength-reducing defects.

What is claimed is:

1. A process for the production of high-strength $Si_3N_4$-based material with a narrow range spread of values for mechanical properties which comprises: molding a powder-form starting mixture consisting essentially of 5 to 20% by weight finely divided elemental silicon, 1 to 15% by weight of at least one sintering additive and 65-94% by weight powdered $Si_3N_4$, heat treating the starting mixture at a temperature equal to or below 1400° C. in a nitrogen atmosphere at atmospheric pressure until a complete reaction of the elemental silicon with the nitrogen gas to $Si_3N_4$ takes place, and continuing the heat treating of the mixture after all of the elemental silicon has been converted to $Si_3N_4$, at a temperature above 1400° C., to obtain a sintered molding very near the theoretical density of the material.

2. A process as claimed in claim 1 wherein the at least one sintering additive consists essentially of at least one material selected from the group consisting of $Li_2O$, BeO, MgO, CaO, SrO, BaO, $Al_2O_3$, $Sc_2O_3$, $Y_2O_3$, $La_2O_3$ and all other rare earth oxides, $TiO_2$, $ZrO_2$, $HfO_2$, $Be_3N_2$, BN, AlN, ScN, YN, LaN and all other rare earth nitrides, TiN, ZrN, HfN, NbN and TaN.

3. A process as claimed in claim 1 wherein the sintering additives are those which do not enter into any reaction with the elemental silicon under sintering conditions.

4. A process as claimed in claim 1 wherein the at least one sintering additive comprises at least one material selected from the group consisting of $Li_2O$, BeO, MgO, CaO, SrO, BaO, $Al_2O_3$, $Sc_2O_3$, $Y_2O_3$, $La_2O_3$ and all other rare earth oxides, $TiO_2$, $ZrO_2$, $HfO_2$, $Be_3N_2$, BN, AlN, ScN, YN, LaN and all other rare earth nitrides, TiN, ZrN, HfN, NbN TaN, SiC and $B_4C$.

5. A process for the production of high-strength $Si_3N_4$-based material with a narrow range spread of values for mechanical properties which comprises: molding a powder-form starting mixture consisting essentially of 5 to 10% by weight finely divided elemental silicon, 1 to 15% by weight of at least one sintering additive and 75-94% by weight powdered $Si_3N_4$, heat treating the starting mixture at a temperature equal to or below 1400° C. in a nitrogen atmosphere until a complete reaction of the elemental silicon with the nitrogen gas to $Si_3N_4$ takes place, and continuing the heat treating of the mixture after all of the elemental silicon has been converted to $Si_3N_4$, at a temperature above 1400° C., to obtain a sintered molding very near the theoretical density of the material.

6. A process as claimed in claim 5 wherein the at least one sintering additive consists essentially of at least one material selected from the group consisting of $Li_2O$, BeO, MgO, CaO, SrO, BaO, $Al_2O_3$, $Sc_2O_3$, $Y_2O_3$, $La_2O_3$ and all other rare earth oxides, $TiO_2$, $ZrO_2$, $HfO_2$, $Be_3N_2$, BN, AlN, ScN, YN, LaN and all other rare earth nitrides, TiN, ZrN, HfN, NbN and TaN.

7. A process as claimed in claim 5 wherein the at least one sintering additive comprises at least one material selected from the group consisting of $Li_2O$, BeO, MgO, CaO, SrO, BaO, $Al_2O_3$, $Sc_2O_3$, $Y_2O_3$, $La_2O_3$ and all other rare earth oxides, $TiO_2$, $ZrO_2$, $HfO_2$, $Be_3N_2$, BN, AlN, ScN, YN, LaN and all other rare earth nitrides, TiN, ZrN, HfN, NbN TaN, SiC and $B_4C$.

8. A process as claimed in claim 5 wherein the heat treatment is carried out by sintering under elevated nitrogen pressure by hot isostatic pressing or by axial hot pressing.

9. A process as claimed in claim 5 wherein the heat treatment is carried out by hot isostatic pressing or by axial hot pressing.

10. A process as claimed in claim 9 wherein the heat treatment is carried out under nitrogen pressure.

* * * * *